United States Patent [19]

Indyke

[11] Patent Number: 4,839,398
[45] Date of Patent: Jun. 13, 1989

[54] POLYIMIDE FOAMS AND THEIR PREPARATION

[75] Inventor: David M. Indyke, Arlington Heights, Ill.

[73] Assignee: Ethyl Corporation, Richmond, Va.

[21] Appl. No.: 227,098

[22] Filed: Aug. 1, 1988

Related U.S. Application Data

[62] Division of Ser. No. 187,493, Apr. 28, 1988.

[51] Int. Cl.$^4$ .............................................. C08J 9/02
[52] U.S. Cl. ....................... 521/183; 521/110; 521/184; 521/185; 521/189; 528/289; 528/292; 528/296
[58] Field of Search ................... 528/289, 292, 296; 521/183, 184, 185, 189, 110

[56] References Cited

U.S. PATENT DOCUMENTS

| | | | |
|---|---|---|---|
| Re. 30,213 | 2/1980 | Gagliani et al. | 521/185 |
| Re. 32,255 | 9/1986 | Gagliani et al. | 521/56 |
| Re. 32,256 | 9/1986 | Gagliani et al. | 521/180 |
| 3,506,583 | 4/1970 | Boram et al. | 252/188 |
| 3,700,649 | 10/1972 | Boram et al. | 260/65 |
| 3,726,831 | 4/1973 | Acle et al. | 260/47 CP |
| 3,726,834 | 4/1973 | Acle | 260/65 |
| 3,793,281 | 2/1974 | Acle | 260/2.5 N |
| 4,070,312 | 1/1978 | Gagliani et al. | 260/2.5 N |
| 4,153,783 | 5/1979 | Gagliani et al. | 528/337 |
| 4,241,114 | 12/1980 | Gagliani | 427/370 |
| 4,241,193 | 12/1980 | Gagliani | 521/77 |
| 4,255,488 | 3/1981 | Gagliani | 428/398 |
| 4,273,886 | 6/1981 | Gagliani | 521/185 |
| 4,296,208 | 10/1981 | Gagliani | 521/77 |
| 4,299,787 | 11/1981 | Gagliani | 264/41 |
| 4,305,796 | 12/1981 | Gagliani et al. | 204/159 |
| 4,315,076 | 2/1982 | Gagliani et al. | 521/77 |
| 4,315,077 | 2/1982 | Gagliani et al. | 521/77 |
| 4,315,080 | 2/1982 | Gagliani et al. | 521/189 |
| 4,319,000 | 3/1982 | Gagliani et al. | 521/189 |
| 4,332,656 | 6/1982 | Gagliani et al. | 204/159 |
| 4,346,182 | 8/1982 | Gagliani et al. | 521/189 |
| 4,353,998 | 10/1982 | Gagliani et al. | 523/219 |
| 4,355,120 | 10/1982 | Gagliani et al. | 521/189 |
| 4,360,604 | 11/1982 | Gagliani et al. | 521/189 |
| 4,361,453 | 11/1982 | Gagliani et al. | 156/79 |
| 4,363,690 | 12/1982 | Gagliani et al. | 156/307 |
| 4,363,883 | 12/1982 | Gagliani et al. | 521/122 |
| 4,367,296 | 1/1983 | Gagliani et al. | 521/189 |
| 4,369,261 | 1/1983 | Gagliani et al. | 521/189 |
| 4,407,980 | 10/1983 | Gagliani et al. | 521/99 |
| 4,425,441 | 1/1984 | Gagliani et al. | 521/56 |
| 4,426,463 | 1/1984 | Gagliani et al. | 521/180 |
| 4,433,068 | 2/1984 | Long et al. | 521/54 |
| 4,439,381 | 3/1984 | Gagliani et al. | 264/26 |
| 4,442,283 | 4/1984 | Gagliani et al. | 528/323 |
| 4,444,823 | 4/1984 | Gagliani et al. | 428/113 |
| 4,468,431 | 8/1984 | Okey | 428/317 |
| 4,476,254 | 10/1984 | Long et al. | 521/180 |
| 4,506,038 | 3/1985 | Gagliani et al. | 521/103 |
| 4,518,717 | 5/1985 | Long et al. | 521/109 |
| 4,535,099 | 8/1985 | Lee et al. | 521/154 |
| 4,535,101 | 8/1985 | Lee et al. | 521/189 |
| 4,539,336 | 9/1985 | Long et al. | 521/77 |
| 4,539,342 | 9/1985 | Lee et al. | 521/189 |
| 4,546,115 | 10/1985 | Gagliani et al. | 521/77 |
| 4,556,682 | 12/1985 | Gagliani et al. | 521/185 |
| 4,562,112 | 12/1985 | Lee et al. | 428/318 |
| 4,576,862 | 3/1986 | Lee et al. | 428/317 |
| 4,585,805 | 4/1986 | Gagliani et al. | 521/129 |
| 4,599,365 | 7/1986 | Gagliani et al. | 521/56 |
| 4,600,770 | 7/1986 | Gagliani et al. | 528/322 |
| 4,604,409 | 8/1986 | Gagliani et al. | 521/157 |
| 4,621,015 | 11/1986 | Long et al. | 428/317 |
| 4,639,343 | 1/1987 | Long et al. | 264/45.5 |
| 4,647,597 | 3/1987 | Shulman et al. | 521/185 |
| 4,656,198 | 4/1987 | Shulman et al. | 521/56 |
| 4,708,972 | 11/1987 | Long et al. | 521/185 |

OTHER PUBLICATIONS

Gagliani, NAS9-14718, Final Report 7/1/75-12/31/75 entitled "Fire Resistant Resilient Foams".

Gagliani, et al., NAS9-15050, Final Report, Jun., 1977 entitled "Development of Fire-Resistant, Low Smoke Generating, Thermally Stable End Items for Aircraft and Spacecraft".

Gagliani, et al., NAS9-15848, Final Report 2/15/77-4/15/80 entitled "Development of Fire-Resistant, Low Smoke Generating, Thermally Stable End Items for Commercial Aircraft & Spacecraft Using a Basic Polyimide Resin".

Gagliani, et al., NAS9-16009, Final Report 2/15/80-9/30/81 entitled "Formulation & Characterization of Polyimide Resilient Foams of Various Densities for Aircraft Seating Applications".

Primary Examiner—Morton Foelak
Attorney, Agent, or Firm—J. F. Sieberth

[57] ABSTRACT

Described are flexible polyimide foams having enhanced compression fatigue life and softness for use in the manufacture of seat cushions and methods for the production of such foams and precursors therefor. These foams are produced from novel polyimides prepared by reaction of an organic tetracarboxylic acid or derivative thereof, preferably an ester with (a) about 1 to about 50 mol percent of a diester of (i) a primary amino-substituted aromatic carboxylic acid, and (ii) a polymethylene glycol, and (b) at least one aromatic or heterocyclic primary diamine. Foams can be produced having (a) a fatigue life as determined by ASTM test procedure D 3574-81 using foam specimens from three to five inches in thickness of at least 15,000 cycles, or (b) an indentation force deflection as determined by ASTM test procedure D3574-81 on foam specimens of one-inch thickness of less than 40 pounds of force at 25% deflection and less than 180 pounds of force at 65% deflection, or both of (a) and (b).

29 Claims, No Drawings

POLYIMIDE FOAMS AND THEIR PREPARATION

This application is a division of application Ser. No. 187,493, filed Apr. 28, 1988.

TECHNICAL FIELD

This invention relates to new and useful polyimides, and more particularly to novel polyimides and polyimide foams having improved properties, to novel precursors from which such polyimides and polyimide foams can be prepared, and to processes for their preparation.

BACKGROUND

A great deal of effort has been devoted to the development of polyimides and polyimide foams having useful properties. One promising area of application for flexible polyimide foams is as a potential substitute for flammable polyurethane foams in aircraft seat cushions and the like, where the fire resistance and lightness of polyimides would be of considerable advantage.

Unfortunately, previously known flexible polyimide foams generally suffer from either or both of two shortcomings limiting their usefulness for seat cushion applications:

1. Lack of sufficient compression fatigue life, which means that the foam prematurely loses its resiliency (ability to return to its original shape) after repeated compression during usage.
2. Lack of sufficient softness which causes the cushion to be stiffer and less comfortable than desired.

THE INVENTION

This invention provides new and useful flexible polyimides which can overcome either or both of the foregoing shortcomings.

Pursuant to one embodiment there is provided a polyimide foam prepared by reaction of an organic tetracarboxylic acid or derivative thereof (e.g., salt, acid halide, anhydride or preferably ester thereof) with (a) about 1 to about 50 mol percent of a diester of (i) a primary amino-substituted aromatic carboxylic acid and (ii) a polymethylene glycol, and (b) at least one aromatic or heterocyclic primary diamine. These polyimides per se constitute an additional embodiment of this invention.

Another embodiment of this invention involves provision of a foamable polyimide precursor comprising an essentially stoichiometric mixture of (a) at least one organic tetracarboxylic acid ester, and (b) a mixture of at least two primary diamines, one such diamine being about 1 to about 50 mol percent of a diester of (i) an amino-substituted aromatic carboxylic acid and (ii) a polymethylene glycol, and a second such diamine being an aromatic or heterocyclic diamine.

A still further embodiment of this invention involves a method of preparing a polyimide foam which comprises reacting an essentially stoichiometric mixture of (a) at least one organic tetracarboxylic acid (or derivative thereof, preferably an ester), and (b) at least two primary diamines, one such diamine being about 1 to about 50 mol percent of a diester of (i) an amino-substituted aromatic carboxylic acid and (ii) a polymethylene glycol, and a second such diamine being an aromatic or heterocyclic diamine; and heating the reaction mixture to cure it into polyimide foam. When using the free tetracarboxylic acid or a salt, acid halide or anhydride thereof, a suitable blowing agent should be present in the reaction mixture to cause the foam structure to be developed. Use of the ester is preferred as this results in the development of the foam structure even without use of a blowing agent.

Yet another embodiment of this invention is a polyimide foam having (a) a fatigue life as determined by ASTM test procedure D 3574-81 using foam specimens from three to five inches in thickness of at least 15,000 cycles, or (b) an indentation force deflection as determined by ASTM test procedure D3574-81 on foam specimens of one-inch thickness of less than 40 pounds of force at 25% deflection and less than 180 pounds of force at 65% deflection, or both of (a) and (b). For the purposes of this invention, failure in the foregoing fatigue life test procedure is either (i) a thickness loss of more than 10%, (ii) a loss in indentation force deflection at 40% deflection of more than 10%, or (iii) a significant visually-perceivable surface cracking.

The above and other embodiments, features and advantages of this invention will become still further apparent from the ensuing description and appended claims.

In the practice of this invention the flexible polyimides are formed by use of a combination of primary diamines, one of which is a diester of an amino-substituted aromatic carboxylic acid and a polymethylene glycol, and a second of which is a different aromatic diamine or a heterocyclic diamine. Such diesters may be represented by the general formula:

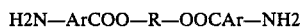

$$H_2N-ArCOO-R-OOCAr-NH_2$$

wherein R is an alkylene group (which may be branched or straight chain) and which preferably contains from 3 to 8 carbon atoms, most preferably trimethylene; and Ar is an aromatic group which may be composed of one or more fused or non-fused benzene rings which in turn may carry suitable substituents (e.g., nitro, alkoxy, etc.) in addition to the primary amino groups.

A few exemplary diesters of this type include:
ethylene glycol-4-aminobenzoic acid diester;
ethylene glycol-3-aminobenzoic acid diester;
ethylene glycol-2-aminobenzoic acid diester;
trimethylene glycol-3-aminobenzoic acid diester;
trimethylene glycol-2-aminobenzoic acid diester;
trimethylene glycol-3-amino-2-nitrobenzoic acid diester;
tetramethylene glycol-3-amino-4-nitrobenzoic acid diester;
tetramethylene glycol-3-amino-5-nitrobenzoic acid diester;
tetramethylene glycol-4-amino-2-nitrobenzoic acid diester;
1,5-pentanediol-4-amino-3-nitrobenzoic acid diester;
1,6-hexanediol-5-amino-2-nitrobenzoic acid diester;
neopentyl glycol-4-amino-2-methylbenzoic acid diester;
1,8-octanediol-4-amino-2-propylbenzoic acid diester;
1,9-nonanediol-3-amino-4-methylbenzoic acid diester;
1,10-decanediol-4-(4-aminophenyl)benzoic acid diester;
and the like. Mixture of such diesters may be employed.

A particularly preferred diester of this type is the diester of trimethylene glycol (1,3-propanediol) and 4-aminobenzoic acid.

The other organic diamines with which the foregoing diamino-substituted diesters are employed may be represented by the formula:

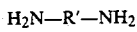

wherein R' is an aromatic group containing 5 to 16 carbon atoms and containing up to one hetero atom in the ring, the hetero atom being nitrogen, oxygen or sulfur. Also included are aromatic groups such as:

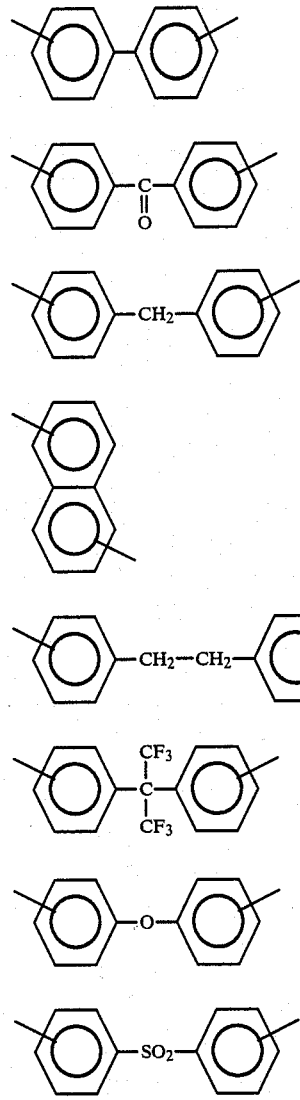

Representatives of such diamines include:
2,6-diaminopyridine;
3,5-diaminopyridine;
3,3'-diaminodiphenylsulfone;
4,4'-diaminodiphenylsulfone;
4,4'-diaminodiphenylsulfide;
3,3'-diaminodiphenylether;
4,4'-diaminodiphenylether;
meta-phenylenediamine;
para-phenylenediamine;
4,4'-methylene dianiline;
2,6-diamino toluene;
2,4-diamino toluene;
and the like.

It is also possible and sometimes desirable in the preparation of the polyimide precursors of this invention, to include in the reaction mixture one or more aliphatic diamines. Such aliphatic diamines are preferably alpha-omega diaminoalkanes having the formula:

(I)

wherein n is an integer from 2 to 16. Representatives of such diamines include 1,3-diaminopropane, 1,4-diaminobutane, 1,5-diaminopentane, 1,6-diaminohexane, etc.

In place of or in addition to the foregoing aliphatic amines, use can be made of aliphatic etherified polyamines of the type polyoxypropylene amines having the formula:

$$H_2N-CH(CH_3)CH_2-[OCH_2CH(CH_3)]_x-NH_2 \quad (II)$$

wherein x varies from 1 to about 5 carbon atoms.

Other useful primary diamines which may be included in the products of this invention include amine-terminated butadiene-nitrile copolymers having the general formula:

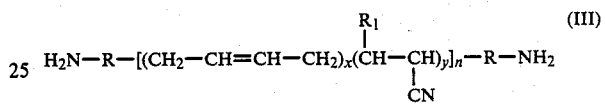

wherein R is either a phenylene group or an alkylene group, $R_1$ is hydrogen or methyl, and x and y or each independently integers ranging from 1 to 25 and n is an integer, preferably below 20. In these copolymers it is preferred that butadiene constitute at lesat 50% by weight of the butadiene and nitrile monomer. The nitrile monomer copolymerized with the butadiene can either be acrylonitrile or methacrylonitrile. Such copolymers generally have low molecular weights, preferably less than 3,000 to insure that they are sufficiently fluid to react in the formation of the polyimide as well as sufficiently fluid so as to be capable of foaming.

Still another type of primary diamines which may be included in the products of this invention is the aromatic amino-terminated silicones, such as those having the general formula:

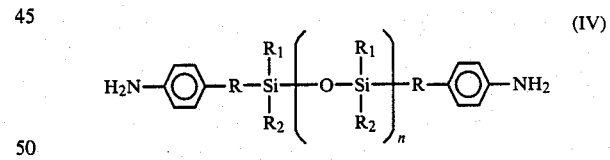

(IV)

wherein R is a $C_2$ to $C_6$ alkylene group, $R_1$ and $R_2$ are each independently lower alkyl containing 1 to 3 carbon atoms and n is an integer from 1 to 4.

In the practice of this invention the organic tetracarboxylic acid preferably in the form of its diester, most preferably from methanol or ethanol, is reacted with the above-referred-to combination of amines to form a prepolymer in the form of a consolidated, fragile foam structure, which is then subjected to additional heating in order to effect imide formation and thereby cure the polymer. When using the tetracarboxylic acid ester this operation can be conducted either in the presence or absence of an added blowing agent to provide the desired polyimide foam.

The tetracarboxylic acid esters preferably employed in the practice of this invention have the general formula:

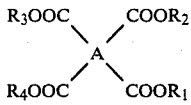

wherein A is a tetravalent organic group and $R_1$ to $R_4$ inclusive are independently hydrogen or lower alkyl, most preferably methyl, ethyl, or propyl, The tetravalent organic group A is preferably one having one of the following structures:

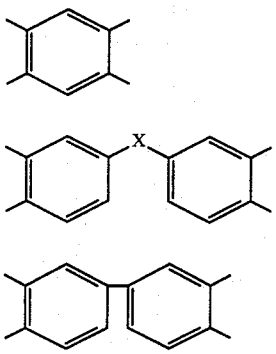

wherein X is one or more of the following:

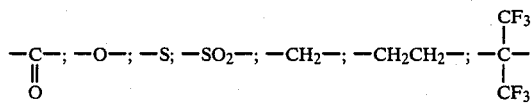

Preferred among the tetracarboxylic acid esters are the alkyl esters of 3,3',4,4'-benzophenone tetracarboxylic acid, most preferably the lower alkyl diesters thereof. Mixtures of two or more aromatic esters, most preferably predominating in diesters, may be employed, if desired.

It is also possible, in accordance with this invention, that the tetracarboxylic acid derivative employed in the manufacture of the polyimide foams be a caprolactam as taught by U.S. Pat. Nos. 4,161,477, 4,183,838 and 4,183,839, the disclosures of which are incorporated herein by reference. As described in those patents, a bis-imide is formed by reaction of a tetracarboxylic acid dianhydride with an oxoimine such as caprolactam and then reacted with the diamine or diamines to produce the desired polyimides. The caprolactam is displaced during the reaction, in much the same way as is the ester portion of the tetracarboxylic acid ester.

The relative proportions used in the preparation of the precursors and polymers of this invention can be varied. In general, it is preferred to employ essentially stoichiometric proportions as between the tetracarboxylic acid ester and the combination of primary diamines. However, non-stoichiometric mixtures can be used although the excess of the reactant present in excess usually does not participate in the reaction. As noted above, about 1 to about 50 mol percent (preferably about 20 to about 50 mol percent) of the combination of primary diamines employed is composed of one or more diesters between an amino-substituted aromatic carboxylic acid and a polymethylene glycol. The balance of the combination is composed of aromatic or heterocyclic diamine(s) with or without the addition of still other diamines, for example diamines of the type referred to hereinabove in formulas I, II, III and IV, or any mixture thereof. Usually the overall combination of amines will contain no more than about 10 mol percent of these other diamines.

In accordance with one preferred form of the invention, use is made of a combination of aromatic amines, one of which is a nitrogen heterocyclic diamine, preferably 2,6-diaminopyridine and/or 3,5-diaminopyridine, while the other is a diamine containing two benzene rings, preferably 4,4'-methylenedianiline and/or 4,4'-oxydianiline. When using a combination of aromatic amines in accordance with this concept, the mol ratio of the non-heterocyclic diamine to the nitrogen-containing heterocyclic diamine is within the range of 1.0 to 3.0, and preferably 1.5 to 2.8.

When using a lower alkyl ester of the tetracarboxylic acid, the resulting alcohol produced in the reaction as well as the water released during the reaction can be used as the blowing agent during polymerization to form the desired polyimide foams. Alternatively, use can be made of any of a variety of organic or inorganic blowing agents. By use of a solid blowing agent such as Celogen TSH, Celogen OT, Celogen AZ 130, Celogen RA, Celogen HT 500, Celogen HT 550, sodium bicarbonate, benzenesulfonyl hydrazide, boric acid, benzoic acid, and Expandex 5 PT of controlled particle size, the homogeneity of the cellular structure of the resulting polyimide foam can be more accurately controlled. Preferred for such use are solid blowing agents which have been subjected to ball milling or other grinding so that the blowing agent is less than 200 microns in diameter, with 98 percent of the blowing agent particle size being less than 150 microns in diameter.

The chemical compositions of the blowing agents identified by trade name above follows:

| Blowing Agent | Chemical Composition |
| --- | --- |
| Celogen TSH | toluenesulfonyl hydrazide |
| Celogen OT | p,p'-oxybis(benzenesulfonyl hydrazide |
| Celogen AZ 130 | azodicarbonamide |
| Celogen RA | p-toluenesulfonyl semicarbazide |
| Celogen HT 500 | a modified hydrazine derivative |
| Celogen HT 550 | hydrazol dicarboxylate |
| Expandex 5 PT | 5-phenyltetrazole |

Variations in the concentration of the blowing agent can be used to achieve specific densities and ILD values. Concentrations of up to 10 percent based on the weight of the polyimide precursor, and preferably 1 to 5 percent, can be employed. A concentration of about 2.5 weight percent is particularly preferred.

Hydrated organic compounds of the type referred to in U.S. Pat. No. 4,621,015 may also be used as blowing agents in the process.

In the practice of this invention, it is possible to include in the reaction mixture various filler and/or reinforcing materials. For example, graphite, glass and other synthetic fibers can be added to the composition to produce a fiber-reinforced product. Microballons may be added for density adjustment, if desired. It is frequently desirable to employ a surfactant thereby increasing cellular structure stability and uniformity, and increase fatigue resistance and make the foam more flexible and resilient. The nature of such surfactants for this use is well known and reported in the patent literature.

Although not necessary, for some applications it is desirable to add a suitable quantity of a flame retardant material to the formulation in order to still further increase the flame resistance of the resultant foam.

In preparing the precursors of this invention, it is preferred to employ the procedures and spray drying techniques described in U.S. Pat. No. 4,296,208, the disclosure of which is incorporated herein by reference.

The temperatures at which the precursor is converted to the polyimide foam are generally those temperatures used in the preparation of other polyimide polymers. As a general rule temperatures ranging from 200° to 400° C. can be used, with heating times from 5 to 60 minutes or longer. As those skilled in the art will appreciate, the time for carrying out the reaction is somewhat dependent upon the reaction temperature, higher temperatures enabling the use of shorter reaction times. It is also possible to heat to a lower temperature in the first stage of the reaction and then to higher temperatures in the later stages.

Heating can be carried out in a conventional oven if desired. Alternatively, the foaming and curing of the precursor into a foamed polyimide polymer can be effected by means of microwave heating. In this technique, the precursor is exposed for 1 to 120 minutes to radio frequencies within the range of 915 to 2450 MHz, with the power output ranging from 1 to 100 kw. The power output to prepolymer weight ratio generally falls within the range of 0.1 to 10 kw per kg.

Having described the basic concepts of the invention, reference is now made to the following examples which are provided by way of illustration, but not by way of limitation of the practice of the invention.

The following abbreviations are used in the examples:
MDA —4,4'-Methylenebisaniline
DAP —2,6-Diaminopyridine
TGD —Trimethylene glycol di-p-aminobenzoate
ATBN —Amino-terminated poly(butadiene-acrylonitrile), (HYCAR 1300X16)
ODA —4,4'-Oxydianiline
BTDA —Benzophenone tetracarboxylic acid dianhydride
BTDE —Benzophenone tetracarboxylic acid, methyl ester
DC-193 —Polysiloxane surfactant (Dow Corning Corporation)
pcf —Pounds per cubic foot
IFD —Indentation force deflection as measured by the Indentation Force Test of ASTM Test Designation D 3574-81

All polyimide foams were produced using a two-stage microwave-thermal oven procedure. The microwave was a Gerling Moore 5.5 kw microwave cavity having two microwave sources, only one of which was used. Lower power (one source) was 1.5 kw and full power (one source) was 2.75 kw. Roller fatigue results were measured using the Dynamic Fatigue Test by the "Roller Shear at Constant Force" according to ASTM Test Designation D 3574-81.

EXAMPLE 1

Formulation

[(0.47 mol MDA+0.3 mol DAP+0.25 mol TGD) per mol BTDA]+1.86% DC-193 based on the combined weights of the monomers.

Procedure

A 5-liter, 3-necked round bottom, glass flask in a heating mantle equipped with a stirrer, reflux condenser and thermometer was charged with 1612 g (5 mols) of BTDA, 1286 g (40.14 mols) of methanol, and 60 g of water. The heater and stirrer were switched on. The solution was milky off-white in appearance. After 30 minutes with the temperature at 50° C., the heater was switched off and the mixture was stirred for another 19 minutes. At this point the temperature had reached 71° C. and the reaction mixture had turned into a clear, deep amber solution indicating completion of the esterification reaction. While stirring the system and keeping the temperature between 50 and 65° C., the diamines were added using methanol dilution and washes, in the following amounts and sequence: 393 g (1.25 mols) TGD; 446 g (2.35 mols) MDA; 164 g (1.50 mols) DAP. A total of 805 g of methanol was added during these operations which occurred over a period of about 2 hours. Next, with the temperature of the system at 44° C., 49 g of DC-193 diluted with methanol was added, again using a methanol rinse and the system was stirred for another 2 hours and 15 minutes.

The reaction solution was spray dried under nitrogen in a Niro Mobile Minor srapy dryer. In this operation the solution was fed to the dryer over a 2-hour period with the inlet temperature between 100 and 110° C., the outlet temperature between 68.4 and 70.1° C., and the atomizer speed between 28,000 and 34,900 rpm. This yielded 3,018 g of polyimide precursor in powder form. The powder was sifted through a sieve with 425 micron openings and kept in a sealed plastic bag until used.

Using separate portions of precursor, three polyimide foams were produced. In each case, a free-rise foaming procedure was used (i.e., no mold was utilized). In one run the foam was produced by microwaving for 5 minutes at 1.5 kw and for 10 minutes at 2.75 kw followed by use of a thermal oven held at 490° F. for 1 hour and 15 minutes. In another run the sample was treated in the microwave for 10 minutes at 2.75 kw followed by exposure to 490° F. in a thermal oven for 1 hour and 3 minutes. The third sample was produced in the same fashion as the second sample except that the time in the thermal oven was 1 hour and 15 minutes. Using trimmed sections from the resultant foams, measurements and observations were made of their properties.

Results

The foams were of very good quality with relatively fine cell structures. They were extremely soft, resilient, flexible and non-brittle. The average density was 0.49 pcf.

The IFD (1 inch thick specimen) was 17 pounds of force at 25% deflection and 66 pounds of force at 65% deflection. The roller fatigue test (3 inch thick specimen) was terminated at 14,000 cycles with little surface damage and 15% average thickness loss. The foam had a tensile strength of 11 psi and an elongation at break of 28%.

EXAMPLE 2

Formulation

[(0.53 mol MDA+0.3 mol DAP+0.2 mol TGD) per mol BTDA]+1.86% DC-193 based on the combined weights of the monomers.

Procedure

BTDE was prepared in a 2-liter, 3-necked flask using 386.7 g (1.20 mols) of BTDA, 307.6 g (9.60 mols) of methanol and 14.5 g of water during a 45 minute reaction period with a temperature controlled between 22 and 70° C. The diamines were then added to the deep, clear amber solution. The following sequence and amounts of addition were used: 127.1 g (0.64 mol) of MDA; 39.2 g (0.36 mol) of DAP; 75.2 g (0.24 mol) of TGD. These additions occurred over a period of about 38 minutes with the temperature between 45 and 51° C. Methanol rinses were employed. Thereupon the heater was turned on and the mixture stirred for 23 minutes during which time the temperature increased from about 40° C. to about 62° C. Next, 11.7 g of DC-193 dissolved in methanol was added, again using a methanol rinse. The resultant reaction solution was then dried using a vacuum oven with the vacuum adjusted from 25 to 29 inches of mercury and a temperature of 150° F. The powder was sieved and converted into a polyimide foam using a polypropylene mold in a 2-stage microwave-thermal oven procedure. The powder was subjected to microwaving for 20 minutes at 1.5 kw. In the thermal oven the temperatures were 455° F. for 10 minutes, 470° F. for 22 minutes and 500° F. for 56 minutes. Trimmed sections of the foam were used in determining the physical properties described below.

Results

The polyimide foam had a density of 0.58 pcf, a tensile strength of 10 psi and an elongation of 64% at break.

EXAMPLE 3

Formulation

[(0.34 mol MDA+0.34 mol DAP+0.34 mol TGD) per mol BTDA]+1.87% DC-193 based on the combined weights of the monomers.

Procedure

BTDE was produced at 23°–70° C. from 387 g (1.20 mols) of BTDA, 308 g (9.61 mols) of methanol and 15 g of water. To the resultant clear, dark amber solution were added TGD (129 g; 0.41 mol), MDA (81 g; 0.41 mol) and DAP (45 g; 0.41 mol). The additions were facilitated by use of methanol rinses and the temperature of the reaction mixture was controlled between 36 and 64° C. over a period of 1 hour 48 minutes. To the reaction mixture was then added 12.0 g of DC-193 using methanol dilution and rinse. The resultant mixture was stirred for about 1.5 hours.

The polyimide precursor was isolated in powder form by use of a vacuum oven operated generally as in Example 2. The yield of dried polyimide precursor was 731 g. Sieved polyimide precursor was converted into polyimide foam in a mold by use of the 2-stage microwave-thermal oven procedure. The microwave portion of the cycle involved 20 minutes at 1.5 kw. The final curing in the oven occurred at 470° F. over a period of 1.5 hours.

Results

The polyimide foam had a density of 0.56 pcf.

EXAMPLE 4

Formulation

[(0.72 mol MDA+0.30 mol TGD) per mol BTDA]+1.97% DC-193 based on the combined weights of the monomers.

Procedure

A methanol solution of BTDE was produced from 818 g (2.5 mols) of BTDA, 641 g (20.01 mols) of methanol and 31 g of water. The reaction temperature was raised from 25° to 72° C. during a reaction period of about 1 hour. To this solution were added the following ingredients in the following sequence: TGD (245 g; 0.76 mol); MDA (355 g; 1.79 mols) and 28 g of DC-193. These ingredients were added as methanol solutions and methanol rinses were employed. The maximum reaction temperature was 61° C. The polyimide precursor was recovered in powdered form by use of a spray drying procedure generally as in Example 1 using an inlet temperature between 96 and 102° C., an outlet temperature between 68.8 and 69.7° C. and an atomizer speed ranging from 31,600 to 32,800 rpm. This resulted in a recovery of 1,515 g of polyimide precursor which was stored in a jug until use. Polyimide foams were produced using the 2-stage free-rise microwave-thermal oven procedure (microwave: 2.75 kw for 15 minutes; thermal oven: 480° F. for 1 hour 32 minutes). Trimmed sections from the resultant foams were used for physical property determinations and observations.

Results

The foam was soft, extremely flexible and resilient at room temperature, with a non-homogeneous cell structure. It had a density of 0.92 pcf. The roller fatigue test (3⅛ inch thick specimen) was terminated after 31,866 cycles with an average thickness loss of 16%, a weight loss of 1.1% and some severe cracking. At 14,725 cycles, virtually no damage to the foam was observed in the roller fatigue test.

EXAMPLE 5

Formulation

[(0.31 mol TGD+0.71 mol MDA+0.00038 mol ATBN) per mol BTDA]+2.35% DC-193 based on the combined weights of the monomers.

Procedure

The following ingredients were used to produce BTDE: 981 g (3.00 mols) of BTDA; 769 g (23.76 mols) of methanol; and 36 g of distilled water. To the methanol solution of BTDE was added 1.98 g of ATBN (HYCAR 1300X16, B. F. Goodrich Chemical Company) with the temperature of the methanol solution at 65° C. Heat was then applied and solution brought to reflux temperature for one hour. Then, the other diamines were added by use of methanol dilution and rinses in the order of TGD (294 g; 0.92 mol) and MDA (425 g; 2.14 mols). A total of 509 g of methanol was used in these additions. During the additions the temperatures were maintained between 50 and 63° C. Finally, 40 g of DC-193 was added together with dilution methanol and the solution stirred for an additional 15 minutes. The polyimide precursor was recovered in powder form by use of a spray dryer operated generally as in Examples 1 and 4. The recovery was 1,878 g. One portion of the precursor was placed in a 260° C. air oven for 30 minutes and the resultant foam was subjected to a $T_g$ determined by DSC analysis. Polyimide foam was produced in a mold from the polyimide precursor powder by use of the 2-stage microwave-thermal oven procedure (microwave: 2.75 kw for 20 minutes; thermal oven: 470° F. for 33 minutes and 480° F. for 1 hour and 11 minutes). Trimmed sections of the foams were subjected to physical property determinations.

Results

The foam had a $T_g$ of 242° C., a density of 0.92 pcf, and an IFD (1 inch specimen) of 25 pounds of force at 25% deflection and 112 pounds of force at 65% deflection. The roller fatigue test (3⅜ inch thick specimen) was terminated at 21,972 cycles with no weight loss and an average thickness loss of 2%.

EXAMPLE 6

Formulation

[(0.31 mol TGD+0.71 mol MDA) per mole BTDA]+1.94% DC-193 based on the combined weights of the monomer. Samples were also produced containing either zinc borate or alumina trihydrate fire retardants.

Procedure

A methanol solution of BTDE was produced from 1,636 g (5.00 mols) of BTDA, 1,283 g (39.64 mols) of methanol and 60 g of water using the general procedure of Example 1. To this solution were added 490 g (1.53 mols) of TGD and 709 g (3.57 mols) of MDA. A total of 847 g of dilution methanol was used for these additions. Temperatures were controlled during the additions to between 49 and 60° C. Then, 55 g of DC-193 was added as a methanol solution. The product was spray dried and the resultant dry powder sifted through a No. 25 screen. Polyimide foam was produced from the polyimide precursor (microwave: 10 minutes at 2.75 kw; thermal oven: 1 hour at 475° F.). Into four additional individual quantities of the powdered polyimide precursor were mixed various flame retardants, as follows: Foam A—18 g zinc borate powder (Firebrake ZB; U. S. Borax & Chemical Company) per 100 g polyimide precursor; Foam B—18 g alumina trihydrate powder (SB-632; Solem Industries) per 100 g polyimide precursor; Foam C—18 g alumina trihydrate powder (Akrochem 8.0; Akron Chemical Company) per 100 g polyimide precursor, and Foam D—25 g alumina trihydrate powder (SB-136; Solem Industries) per 100 g polyimide precursor. Each of these mixtures was converted into a polyimide foam by the 2-stage microwave-thermal oven procedure using the following conditions: Foam A—microwave: 1.5 kw for 10 minutes; thermal oven: 475° F. for 63 minutes; Foam B—same as Foam A except 65 minutes in the thermal oven; Foam C—microwave: 1.5 kw for 10 minutes; thermal oven: 470° F. for 43 minutes and 480° F. for 27 minutes; and Foam D—microwave: 1.5 kw for 15 minutes; thermal oven: 475° F. for 1 hour and 9 minutes. All foaming operations in this Example were conducted without use of a mold.

Results

Each of the foams was soft, flexible and resilient. The baseline foam (i.e., without added flame retardant) had a density of 1.12 pcf and showed an LOI (ASTM D 2863-77) of 32–33. Foam A had a density of 0.71 pcf and exhibited an LOI of 41–42. Foam B had a density of 0.77 pcf and exhibited an LOI of 38–39. The density of Foam C was 0.73 pcf with an LOI of 37–38. Foam D had a density of 0.67 of pcf and exhibited an LOI of 39–40.

EXAMPLE 7 Formulation

[(0.31 mol TGD+0.71 mol ODA) per mole of BTDA]+1.94% DC-193 based on the combined weights of the monomers.

Procedure

A solution of BTDE in methanol was produced using BTDA (981 g; 3.00 mols), methanol (768 g; 23.73 mols) and distilled water (36 g). The diamines were added as follows: TGD (294 g; 0.92 mol); and ODA (430 g; 2.14 mols) using methanol dilution and washes. During these additions the temperature was controlled between 45 and 68° C. Then, 33 g of DC-193 diluted with methanol was added. During these operations of total of 510 g of methanol was added to the system. The reaction mixture was stirred for about 3 hours. The polyimide precursor was recovered by use of a spray dryer and sieved through a No. 25 screen. Using a mold, the polyimide precursor was converted into polyimide foam by exposure for 15 minutes in a microwave (2.75 kw power) and 1.5 hours to 475° F. in a thermal oven.

Results

The foam had a density of 0.92 pcf. The roller fatigue test using a foam specimen of 4.5 inches in thickness was terminated at 40,000 cycles with very minor damage to the surface, a weight loss of 0.7% and an average thickness loss of 3.5%. An 8.3% loss in IFD at 40% deflection was incurred.

EXAMPLE 8

Formulation

[(0.31 mole TGD+0.71 mol MDA) per mole BTDA]. Samples were also produced containing various surfactants and flame retardants.

Procedure

A methanol solution of BTDE was formed from 1,636 g (5.00 mols) of BTDA, 1,282 g (39.61 mols) of methanol and 60 g of water. Diamines added to the system were TGD (490 g; 1.53 mols) and MDA (709 g; 3.57 mols). As in the above examples, methanol rinses and dilution were employed. To aid in the dissolution of the TGD the temperature was raised to 70° C. The resin solution was cooled to 40°–45° C. and subdivided into weighed portions by pouring into 1,000 mL Erlenmeyer flasks. The following additives were measured into the respective resin solutions:

Solution A: 6.12 g DC-193 and 16.2 g dimethyl methylphosphonate in 484 g of resin solution Solution B: 6.00 g DC-193 and 15.55 g Antiblaze 1045 phosphate ester (Albright & Wilson Inc.) in 503 g of resin solution Solution C: 6.45 g DC-193 in 485 g of resin solution Solution D: 2.96 g DC-193 in 483 g of resin solution Solution E: 3,26 g Zonyl FSN-100 surfactant (duPont) in 475 g of resin solution Solution F: 2.90 g Arlasolve 200 surfactant (ICI) in 470 g of resin solution Each of these solutions was reheated to somewhat above 50° C. on a hot plate using a magnetic stirrer in order to re-dissolve any precipitates that may have formed. These solutions were poured into separate aluminum foil lined trays and subjected to drying in a vacuum oven at 140° to 150° F. while occasionally breaking up the solids from the upper surfaces and emptying the cold trap as needed. The respective dried products from the solutions were powdered using a household blender operated at the highest speed. The powders were sifted through a No. 25 sieve and stored in plastic jugs. In the two-stage microwave-thermal oven procedure, the following conditions were used:

Product A: microwave 15 minutes at 1.5 kw; thermal oven 470° F. for 1 hour 3 minutes
Product B: microwave 15 minutes at 1.5 kw; thermal oven 480° F. for 1 hour
Product C: microwave 10 minutes at 1.5 kw; thermal oven 470° F. for 1 hour 6 minutes
Product D: microwave 15 minutes at 1.5 kw; thermal oven 470° F. for 61 minutes
Product E: microwave 15 minutes at 1.5 kw; thermal oven 480° F. for 67 minutes
Product F: microwave 15 minutes at 1.5 kw; thermal oven 480° F. for 62 minutes In each free-rise foaming was employed.

Results

Product A: foam density was 0.53 pcf; LOI was 35-36
Product B: foam density was 0.61 pcf; LOI was 41-42
Product C: foam density was 0.53 pcf
Product D: foam density was 0.71 pcf
Product E: foam density was 0.78 pcf
Product F: foam density was 0.89 pcf

EXAMPLE 9

Formulation

[(0.72 mol MDA+0.31 mol TGD) per mole BTDA]+2.0% DC-193 based on the combined weights of the monomers.

Procedure

In this Example, a ten gallon, stainless steel reactor equipped with heating or cooling coils supplied by cold or hot running water, a single blade impeller and an overhead condenser system was used. The following ingredients were charged into the reactor: BTDA (6.543 kg; 20.00 mols), methanol (5.126 kg; 158.4 mols), and distilled water (258 g). While stirring the solution, its temperature was raised from 80° F. to 135° F. over a 40 minute period at which time the heating was discontinued. The solution was stirred for another 10 minutes during which its temperature decreased to 125° F., yielding a clear amber solution of BTDE in methanol. The diamines were charged as follows: TGD (1.961 kg; 6.12 mols) and MDA (2.825 kg; 14.22 mols) using methanol dilution. Then, 227 g of DC-193 was added, again using methanol as a solubility aid. In these operations a total of 3.443 kg of methanol was introduced into the reactor. The mixture was then heated and stirred for about 45 minutes until the temperature reached 55° C. at which point the heating was discontinued. The reaction solution was stirred for an additional 1 hour and 7 minutes. Portions of the reaction solution were dried in a spray dryer. A representative sample of the resultant polyimide precursor was foamed in a mold under the following conditions: microwave: 25 minutes at 2.75 kw; thermal oven: 450° F. for 63 minutes.

Results

The polyimide foam had a tensile strength of 19 psi and a density of 1.06 pcf. The roller fatigue test on a specimen of 4.25 inch thickness was terminated at 23,373 cycles with no weight loss and no loss in IFD at 40% deflection. The foam sustained a 3% to 4% thickness loss but had cracks only at the ends of the roller travel.

When producing the polyimides of this invention for applications other than foams (e.g., for structural applications, adhesives, films, or the like), the mixture of diamines may be reacted with the organic tetracarboxylic acid or a derivative thereof such as its dianhydride, its acid halides, it salts, or its esters. Use of tetracarboxylic acid dianhydrides is most preferred for these particular reactions because of their high reactivity.

It will be understood that various changes and modifications can be made in the details of procedure, formulation and use without departing from the spirit and scope of the invention.

What is claimed is:

1. A polyimide foam prepared by reaction of an organic tetracarboxylic acid or derivative thereof with (a) about 1 to about 50 mol percent of a diester of (i) a primary amino-substituted aromatic carboxylic acid, and (ii) a polymethylene glycol, and (b) at least one aromatic or heterocyclic primary diamine.

2. A polyimide foam as defined in claim 1 wherein the polymethylene glycol contains 3 to 8 carbon atoms in the molecule.

3. A polyimide foam as defined in claim 1 wherein the reaction is conducted in the presence of a surfactant, and optionally, a flame retardant.

4. A polyimide foam as defined in claim 1 wherein the foam is prepared from an organic tetracarboxylic acid ester.

5. A polyimide foam prepared by reaction of di(lower alkyl) ester of benzophenone tetracarboxylic acid with (a) about 20 to about 50 mol percent of diester of (i) a primary amino-substituted benzoic acid and (ii) a polymethylene glycol having 3 to 8 carbon atoms in the molecule, and (b) at least one aromatic or heterocyclic primary diamine.

6. A polyimide foam as defined in claim 5 wherein the reaction is conducted in the presence of a silicone surfactant, and optionally, a flame retardant.

7. A polyimide foam as defined in claim 5 wherein the amino-substituted benzoic acid is p-aminobenzoic acid, the polymethylene glycol is trimethylene glycol, and the aromatic or heterocyclic primary amine is 4,4'-methylenedianiline or 4,4'-oxydianiline, or both.

8. A polyimide foam as defined in claim 7 wherein the aromatic or heterocyclic diamine further includes 2,6-diaminopyridine.

9. A polyimide foam as defined in claim 7 further including an amino-terminated butadiene-acrylonitrile reactant.

10. A polyimide foam prepared by reaction of an organic tetracarboxylic ester with (a) about 1 to about 50 mol percent of a diester of (i) a primary amino-substituted aromatic carboxylic acid, and (ii) a polymethylene glycol, and (b) at least one aromatic or heterocyclic primary diamine, in the presence of a surfactant, said foam having a fatigue life as determined by ASTM test procedure D 3574-81 on foam specimens in the range of from three to five inches in thickness of at least 15,000 cycles, and an indentation force deflection as determined by ASTM test procedure D 3574-81 on foam specimens of one inch thickness of less than 40 pounds of force at 25 percent deflection and less than 180 pounds of force at 65 percent deflection.

11. A polyimide foam as defined in claim 10 wherein said organic tetracarboxylic ester consists essentially a methyl or ethyl ester of benzophenone tetracarboxylic acid and said aromatic or heterocyclic primary diamine is composed predominantly of 4,4'-methylenedianiline or 4,4'-oxydianiline, or both.

12. A polyimide foam as defined in claim 11 wherein said surfactant is a silicone surfactant.

13. A polyimide foam as defined in claim 12 wherein the reaction further includes an amino-terminated butadiene-acrylonitrile copolymer.

14. A polyimide foam as defined in claim 1 wherein the reaction is conducted in the presence of a blowing agent.

15. A polyimide foam as defined in claim 1 wherein the organic tetracarboxylic acid or derivative thereof used in the reaction is a lower alkyl ester of an organic tetracarboxylic acid.

16. A polyimide foam as defined in claim 15 wherein said diester is a diester of an amino-substituted benzoic acid and a polymethylene glycol having 3 to 8 carbon atoms in the molecule.

17. A polyimide foam as defined in claim 15 wherein the reaction is conducted in the presence of at least a surfactant.

18. A polyimide foam as defined in claim 15 wherein said aromatic or heterocyclic primary amine is 4,4'-methylenedianiline or 4,4'-oxydianiline, or both.

19. A polyimide foam as defined in claim 18 wherein the aromatic or heterocyclic diamine further includes a diaminopyridine.

20. A polyimide foam as defined in claim 18 wherein the reaction further includes an amino-terminated butadiene-acrylonitrile reactant.

21. A polyimide foam as defined in claim 15 wherein said diester is trimethylene glycol di-p-aminobenzoate.

22. A polyimide foam as defined in claim 21 wherein said aromatic or heterocyclic primary amine is 4,4'-methylenedianiline or 4,4'-oxydianiline, or both, and wherein the reaction is conducted in the presence of at least a surfactant.

23. A polyimide foam as defined in claim 22 wherein the reaction further includes a diaminopyridine or an amino-terminated butadiene-acrylonitrile reactant.

24. A polyimide foam as defined in claim 15 wherein the lower alkyl ester of an organic tetracarboxylic acid is a lower alkyl ester of benzophenone tetracarboxylic acid.

25. A polyimide foam as defined in claim 24 wherein said lower alkyl ester of benzophenone tetracarboxylic acid is predominantly the dimethyl or diethyl ester, wherein said aromatic or heterocyclic primary amine is 4,4'-methylenedianiline or 4,4'-oxydianiline, or both, wherein the reaction further includes a diaminopyridine or an amino-terminated butadiene-acrylonitrile reactant, and wherein the reaction is conducted in the presence of at least a silicone surfactant.

26. A polyimide foam as defined in claim 5 wherein the reaction is conducted in the presence of a surfactant.

27. A polyimide foam as defined in claim 26 wherein the di(lower alkyl) ester of benzophenone tetracarboxylic acid is predominantly a dimethyl or diethyl ester and wherein the aromatic or heterocyclic primary diamine is 4,4'-methylenedianiline or 4,4'-oxydianiline, or both, and wherein the reaction further includes a diaminopyridine or an amino-terminated butadiene-acrylonitrile reactant.

28. A polyimide foam as defined in claim 10 wherein said organic tetracarboxylic ester consists essentially of a lower alkyl ester, and wherein the polymethylene glycol contains 3 to 8 carbon atoms in the molecule.

29. A polyimide foam as defined in claim 10 wherein the organic tetracarboxylic ester is predominantly a lower alkyl ester of benzophenone tetracarboxylic acid, wherein the polymethylene glycol contains 3 to 8 carbon atoms in the molecule, wherein the aromatic or heterocyclic primary diamine is 4,4'-methylenedianiline or 4,4'-oxydianiline, or both, and wherein the reaction further includes a diaminopyridine or an amino-terminated butadiene-acrylonitrile reactant.

* * * * *